United States Patent [19]

Libertini et al.

[11] Patent Number: 4,465,427
[45] Date of Patent: Aug. 14, 1984

[54] AIR AND OIL COOLED BEARING PACKAGE

[75] Inventors: Zoltan L. Libertini, Stamford; Edward O. Hartel, Orange, both of Conn.

[73] Assignee: Avco Corporation, Stratford, Conn.

[21] Appl. No.: 389,006

[22] Filed: Jun. 16, 1982

Related U.S. Application Data

[62] Division of Ser. No. 195,050, Oct. 8, 1980.

[51] Int. Cl.³ .............................................. F01D 25/16
[52] U.S. Cl. ....................................... 415/1; 415/110; 415/111; 415/175; 415/180; 415/112; 308/187; 384/398
[58] Field of Search ............... 415/110, 112, 111, 175, 415/176, 142, 180, 1; 308/187; 384/398

[56] References Cited

U.S. PATENT DOCUMENTS

| | | | |
|---|---|---|---|
| 3,393,024 | 7/1968 | Rhodes et al. | 415/112 |
| 3,976,165 | 8/1976 | Pilarczyk | 415/110 |
| 3,999,376 | 12/1976 | Jeryan et al. | 416/241 B |
| 4,156,342 | 5/1979 | Korta et al. | 415/112 |

Primary Examiner—Stephen Marcus
Assistant Examiner—Brian J. Bowman
Attorney, Agent, or Firm—Ralph D. Gelling

[57] ABSTRACT

A combination air and oil cooled seal housing is provided which also utilizes trapped stagnant air as an insulator. The combination prevents coking of the oil supplied as a lubricant to the bearings and seals in the hot section of a turbine engine. Pressurized air is introduced from the compressor into the inner structure support housing by means of hollow passages. The pressurized air absorbs heat as it traverses the passages in the structure. The oil supplied is connected to an annular shape cavity allowing the oil to be circulated therein and cool the seal support structure. Additional insulation is provided by cylindrically shaped trapped air shields surrounding the bearing package. Oil flowing through the structure can then properly lubricate the seals and bearings which support the turbine rotor stages within the housing assembly.

4 Claims, 1 Drawing Figure

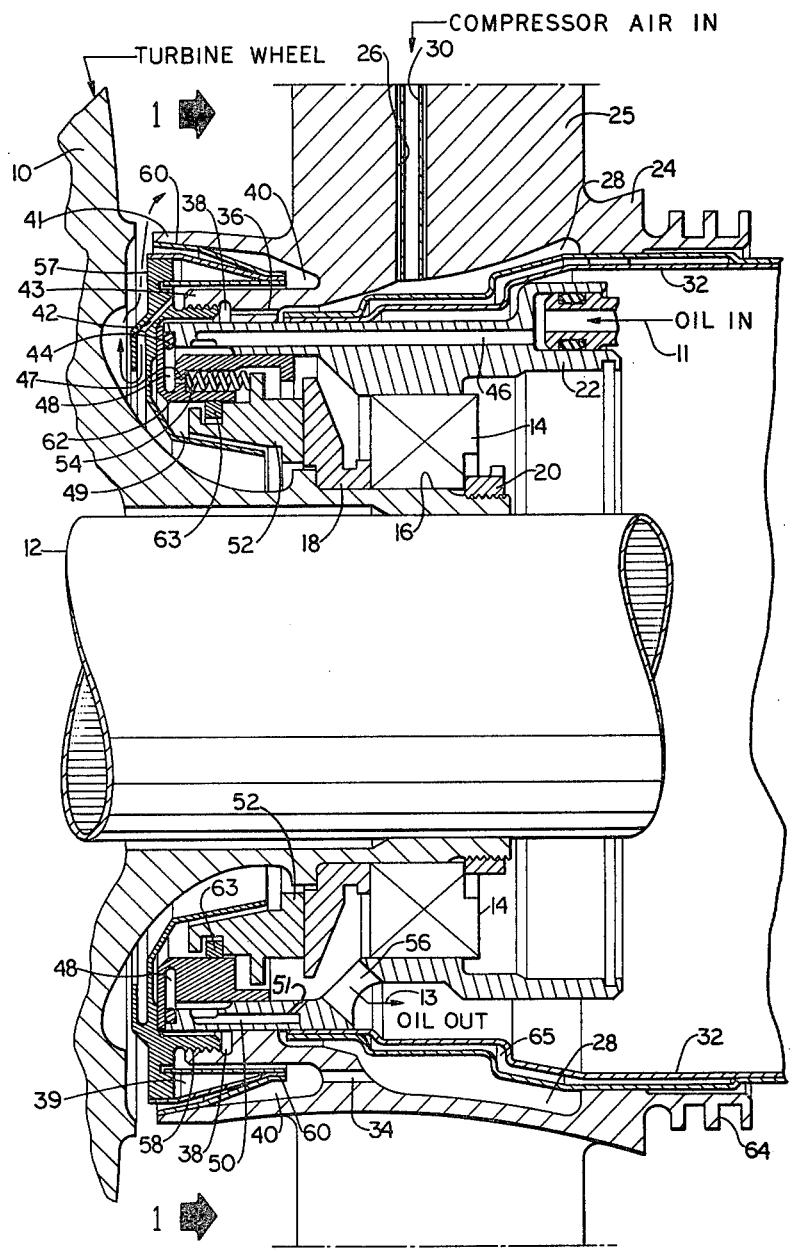

AIR AND OIL COOLED BEARING PACKAGE

The Government has rights in this invention pursuant to Contract No. DAAJ02-77-C-0012 awarded by the Department of the Army.

This is a division of application Ser. No. 195,050 filed Oct. 8, 1980.

BACKGROUND OF PRIOR ART

This invention relates to a bearing housing and seal structure cooled by a combination of air and oil cooling means. The combination of air and oil cooling prevents coking of the oil supplied to lubricate those bearings and seals which must continue to function in a hot environment. Oil has been known to carbonize or coke at the 600° F. temperatures often reached in a turbine engine. This makes it difficult to supply proper lubrication to the bearings which support the turbine stages of a gas turbine engine.

Coking is defined as the carbon residue left when oil evaporates due to high temperatures.

Because of the intense heat developed within the combustion sections of a gas turbine engine, it is necessary to arrange for cooling of the oil flowing through the lubricating passages. It is common practice to use a pressurized closed circuit lubrication system in a turbine engine. After oil has been supplied to components requiring lubrication, it drains into a sump. Most oil lines are cored or drilled passages. Oil draining from the bearings into the sumps is returned to a reservoir through a scavenge pump. Oil is taken from the reservoir by the pressure section of the pump and made to flow through a cooler, a filter and thence through service lines to the gears and bearings requiring lubrication.

Because of the air (and gas) pressures that exist in a gas turbine engine during operation, provisions must be made to control air leakage into bearing areas. A wide variety of seals are successfully used to control both air and oil leakage across the mating rotating surfaces. However, often problems are encountered in the turbine section of an engine which is immediately downstream from the combustor.

To achieve better engine operating efficiencies, that is, lower the specific fuel consumption, combustion temperatures have been raised. As a result, the hot gases passing through the turbine flow path are operationally hotter in the new engines than was the case with engines previously being produced. The higher operating temperatures result in higher temperature environments at both the seals and the bearings within the turbine section of the engine. When the heat transferred from the structure to the lubricating oil flowing therethrough is such that the temperature of the oil is raised above the boiling point, coking results. Carbon residues damage the seals and deterioration of the engine ensues. According to this invention, means are constructed to reduce the operating temperatures of the inner support structures for the bearing package in the turbine section of a gas turbine engine to levels which prevent coking of the lubricating oil. This is accomplished by incorporating a combination of air and oil cooling of this structure.

BRIEF SUMMARY OF THE INVENTION

In this invention a multiple cooling approach is used which includes a cooling air circulating system, an oil cooling system and stagnant air insulating barriers. Pressurized air from the compressor section of the engine is supplied through supporting struts or vanes to the bearing package support housing and flows through passages which surround the bearing package as well as the oil carrying parts. This forms a cooling layer to reduce heat transfer from the hot turbine gas through structural elements to the seal area. Stagnant chambers are also constructed to trap insulating air at critical points, in particular, to form a shield surrounding the bearing package and to separate the seal housing from hotter structural parts.

Oil directly from the engine oil cooler is allowed to circulate around the seal housing before it is injected into the bearing compartment.

BRIEF DESCRIPTION OF THE DRAWING

The sole FIGURE of the drawing is a cross sectional view of the combination oil and air cooled bearing package as implemented in a turbine engine.

DETAILED DESCRIPTION OF THE PREFERRED EMBODIMENT

The subject invention is applied, as shown in the drawing, to the bearing package inner support structure 24 which is, in this instance, located just downstream of the turbine rotor 10. It will be understood that during engine operation, hot combustion gases flow through turbine rotor 10 in the direction shown by arrows 1. Struts 25 support the inner structure 24 and radially extend from a shroud (not shown).

The seal 52 prevents loss and contamination of oil used to lubricate the bearing 14 which supports turbine wheel 10 and shaft 12. To avoid coking of the oil in the vicinity of the seal 52, all wall temperatures which are in contact with the oil have to be kept below the 600° F. coke point. This is done by a combination of oil and air cooling of the bearing package support structure. Oil flow is maintained at sufficient flow rate to minimize its temperature rise from oil input 11 to oil output 13 (see top and bottom portions of the drawing). Secondly, the very hot portion of structure 24 in contact with gas flow path 1 is partially cooled by forcing a small amount of compressor air to ventilate that portion of the structure which surrounds the oil bearing passages. This is accomplished as described below.

The cutaway rear portion of the turbine wheel 10 is shown in the drawing. The hub of turbine wheel 10 has a central opening that receives shaft 12. The inner race of bearing 14 is mounted on a shoulder 16, machined on the end of the turbine wheel hub. The inner race of bearing 14 is held in position between seal runner 18 and nut 20. The outer race of bearing 14 is circumscribed by bearing housing 22. Bearing housing 22 is brazed into the inner support structure 24. An opening 26 is made in the strut 25 and extends from the outer shroud radially inward toward plenum 28. Within opening 26 a tube 30 is inserted which allows compressed air from the compressor section of the engine (not shown) to be injected into plenum 28. Tube 30 is undersized to allow a clearance which provides an insulation barrier around the air supply tube 30. Plenum 28 extends circumferentially around shield assembly 32.

Inserted at the inner wall of plenum 28 is a cylindrical shield 32 which is constructed with a sealed dead space 65. Shield 32 surrounds the bearing support housing 22 and with the insulating trapped air space 65 forms an effective heat transfer barrier for the housing 22.

Air is conveyed from plenum 28 through passages 34 and 36 which are drilled through the inner portions of the inner support structure 24. Air flowing through passage 36 will enter and pressurize annulus 38 which again extends circumferentially around bearing housing 22. Air flowing through passage 34 fills circumferential cavity 40 and escapes through passage 42 into the area behind turbine wheel 10. Flow of the cooling air through the structure 24 serves to cool the area of structure 24 which on its flow path side is immersed in the hot exhaust gas passing through the turbine wheel.

The bearing housing 22 has a passage 46 which allows lubricating oil to be delivered to both the seal 52 and the bearing race 14. The forwardmost end of oil passage 46 terminates at an oil annulus 48 and a metal O-ring 44 stops oil leaks from annulus 48 to annulus 38 and to the hot flow path 1. At a separate location around the periphery of oil annulus 48, there are a multiplicity of oil passages 50 with jets 51 which allow the oil to be injected both into the bearing race of bearing 14 and the interface between seal 52 and the seal runner 18. The moving oil in the annulus 48 cools the seal housing 62 which prevents coke formation, thus permitting the spring 54 and ring seal 63 to operate properly. Since the seal runner 18 is fixed to the hub of turbine wheel 10 and the seal 52 is fixed through seal housing 62 and nut 57 to the inner support structure 24, there is relative motion between the two elements whenever the turbine wheel 10 rotates.

The seal 52 is held against the seal runner 18 by means of a multiplicity of springs 54. The springs 54 may be cooled by providing a port 47 between oil annulus 48 and the seal of springs 54. Adjacent the seal runner 18 is a port 56 which allows oil to flow out to the bearing housing 22. This outward flow is returned to the oil sump through a passage (not shown). The seal housing 62 with springs 54 and seal 52 is held in position by locking nut 57 which is attached by threads 58 to the end of bearing housing 22. Locking nut 57 may be formed to provide an additional stagnant air cavity at 49. Nut 57 holds seal housing 62 against the end of bearing housing 22. A sealing ring 63 rides in a groove formed in the outward facing side of seal 52, thus preventing leakage of oil between seal 52 and seal housing 62.

Use of trapped stagnant air as an insulation medium is achieved by the configuration shown in the drawing. Air entering via passage 36 is trapped in annulus 38 which extends circumferentially around the outward facing end of bearing housing 22. When filled with stagnant air, annulus 38 serves to shield the end of bearing housing 22 so that the oil in oil annulus 48 will not be heated above the boiling point.

Air entering the circumferential cavity 40 via passage 34 also acts as an insulator. Circumferential cavity 40 is formed by the flanges 41 and 43 which are part of inner support structure 24. Sheet metal shield 60 is pressed into cavity 40 and serves to keep air from escaping. This three-part sheet metal shield 60 prevents leakage of air from cavity 40 and is constructed with sealed dead air cavity 39. The pressure difference between the air in cavity 40 and the gaseous medium behind turbine wheel 10 is not significant. Therefore, leakage between shield 60 and the nut 57 interface will be minimal. As a result, the air in circumferential cavity 40 in the vicinity of structure 41 is trapped and serves to insulate structure 41. However, it is flowing along structure 43 while flowing into passage 42 and, therefore, has a cooling effect on structure 43.

Additional air insulation is achieved by the configuration of shield assembly 32. As shown in the drawing, shield assembly 32 is comprised of an inner and an outer shell. Between the two is an annular cavity 65. The captive air in annular cavity 65 insulates the shield assembly such that its inner and outer faces can be operationally at different temperatures. This means that the temperature of oil-output 13 is not further raised by the hot air in cavity 28.

While only one form of the invention has been shown, it is to be recognized that other forms and variations will occur to those skilled in the art. For example, hollow shapes milled for direct support of the bearing race in the support structure and, therefore, not requiring use of a separable bearing housing could be configured. The use of air as both a heat absorbing and insulating medium is the criteria required to lower structural temperatures to a level which will keep the oil from being heated to the coking level. Therefore, while the preferred form of the invention has been concisely illustrated, in order to fully explain the principles of the invention, it is not our intention to limit or narrowly describe the invention beyond the broad concept set forth in the appended claims.

What is claimed is:

1. In the turbine section of a gas turbine engine, said engine having means to supply pressurized cooling air and cooled oil to said turbine section and said turbine section including a structural shroud which defines the flow path; a method of cooling and insulating the oil contacting surfaces in a bearing package including seals and bearings and positioned to support the engine shaft in the turbine section comprising:
   supporting said bearing package within an inner structural member fixed by struts to the turbine shroud;
   constructing an air supply plenum surrounding the bearing package;
   supplying cooling air through said struts to the air supply plenum;
   positioning a shield containing a sealed insulating cavity therein surrounding the bearing package between the air supply plenum and the bearing package;
   distributing cooling air from the air supply plenum to and around the bearing package;
   distributing oil within the bearing package in conduits positioned inward of the combined insulating means formed by the above steps; and
   circulating said oil within the seal portion of the bearing package to cool said seal portion.

2. In the turbine section of a gas turbine engine, a method of cooling and insulating the oil contacting surfaces in a bearing package including seals and bearings and positioned to support the engine shaft in the turbine section as descried in claim 6 wherein the distribution of oil within the bearing package is accomplished at a flow rate which will minimize heat transfer to the oil.

3. In the turbine section of a gas turbine engine, a method of cooling and insulating the oil contacting surfaces in a bearing package including seals and bearings positioned to support the engine shaft in the turbine section as described in claim 6 wherein a portion of the distributed air is exhausted upstream of the inner structural member to provide a cooling airflow over the external surface of said member.

4. In the turbine section of a gas turbine engine, a method of cooling and insulating the oil contacting surfaces in a bearing package including seals and bearings and positioned to support the engine shaft in the turbine section as described in claim 6 further comprising the step of forming a plurality of gaps within the bearing package structure, communicating with the air supply plenum to receive and trap cooling air therefrom to hinder heat transfer to the bearing package.

* * * * *

UNITED STATES PATENT AND TRADEMARK OFFICE
CERTIFICATE OF CORRECTION

PATENT NO. : 4,465,427
DATED : August 14, 1984
INVENTOR(S) : Zoltan L. Libertini and Edward O. Hartel It is certified that error appears in the above-identified patent and that said Letters Patent are hereby corrected as shown below:

In claims 2, 3 and 4, please change "claim 6" to

---claim 1---.

Signed and Sealed this

Sixth Day of August 1985

[SEAL]

Attest:

DONALD J. QUIGG

Attesting Officer

Acting Commissioner of Patents and Trademarks